US008913513B2

(12) United States Patent
McGowan et al.

(10) Patent No.: US 8,913,513 B2
(45) Date of Patent: Dec. 16, 2014

(54) METHODS, TESTING APPARATUSES AND DEVICES FOR REMOVING CROSS COUPLING EFFECTS IN ANTENNA ARRAYS

(75) Inventors: Neil McGowan, Stittsville (CA); Peter Deane, Fitzroy Harbour (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 505 days.

(21) Appl. No.: 13/126,411

(22) PCT Filed: Sep. 24, 2010

(86) PCT No.: PCT/IB2010/054322

§ 371 (c)(1),
(2), (4) Date: Apr. 27, 2011

(87) PCT Pub. No.: WO2012/038783

PCT Pub. Date: Mar. 29, 2012

(65) Prior Publication Data

US 2012/0076019 A1 Mar. 29, 2012

(51) Int. Cl.

*H04L 12/26* (2006.01)
*H04B 7/00* (2006.01)
*H01Q 1/52* (2006.01)
*H01Q 3/26* (2006.01)

(52) U.S. Cl.

CPC ............. *H01Q 1/523* (2013.01); *H01Q 3/2617* (2013.01)
USPC ............................ 370/252; 370/310; 370/318

(58) Field of Classification Search

USPC ................... 370/252, 310, 318; 342/350–465
See application file for complete search history.

(56) References Cited

U.S. PATENT DOCUMENTS

| | | | | |
|---|---|---|---|---|
| 6,486,828 | B1 * | 11/2002 | Cahn et al. | 342/363 |
| 2004/0228422 | A1 * | 11/2004 | Silveira et al. | 375/299 |

FOREIGN PATENT DOCUMENTS

| | | | |
|---|---|---|---|
| EP | 1349234 | A2 | 10/2003 |
| JP | 2005257298 | A | 9/2005 |
| KR | 20050087894 | | 9/2005 |

OTHER PUBLICATIONS

International Search Report for PCT/IB2010/054322 mailed Jul. 29, 2011.

Written Opinion for PCT/IB2010/054322 mailed Jul. 29, 2011.

Derneyd, A., "Compensation of Mutual Coupling Effects in Array Antennas," IEEE Antennas and Propagation Society International Symposium 1996 Digest, Jul. 21-26, 1996, pp. 1122-1125, XP002325032.

(Continued)

*Primary Examiner* — Melanie Jagannathan
(74) *Attorney, Agent, or Firm* — Patent Portfolio Builders PLLC

(57) ABSTRACT

Methods and devices for removing cross coupling effects between elements of an antenna array (110) are provided. Cross coupling coefficients between all pairs of antenna elements of the antenna array are predetermined to minimize a total power in theoretical null points calculated without considering the cross element effects. A transceiver (100) includes a multiplexing block (105) configured to receive data signals to be transmitted via the antenna elements and to output to at least one of the antenna elements, a sum signal including (i) a data signal, which data signal is designated for the at least one antenna element, and (ii) a linear combination of data signals designated for other antenna elements of the antenna array, each of the data signals in the linear combination being weighted by a respective cross coupling coefficient between the at least one antenna element and an antenna element emitting the each of the data signals.

20 Claims, 10 Drawing Sheets

(56) References Cited

OTHER PUBLICATIONS

Darwood, P., et al., "Mutual coupling compensation in small planar array antennas,", IEEE Proceedings: Microwaves, Antennas, and Propagation, vol. 145, No. 1, Feb. 12, 1998, pp. 1-6, XP006011235.

Hui, H., "Decoupling Methods for the Mutual Coupling Effect in Antenna Arrays: A Review," Recent Patents on Engineering, vol. 1, No. 2, Jun. 1, 2007, pp. 187-193, XP55002012.

Hui, H., "Reducing the Mutual Coupling Effect in Adaptive Nulling Using a Re-Defined Mutual Impedance," IEEE Microwave and Wireless Components Letters, vol. 12, No. 5, May 2002, pp. 178-180.

Hui, H., "A Practical Approach to Compensate for the Mutual Coupling Effect in an Adaptive Dipole Array," IEEE Transactions on Antennas and Propagation, vol. 52, No. 5, May 2004, pp. 1262-1269.

* cited by examiner

METHODS, TESTING APPARATUSES AND DEVICES FOR REMOVING CROSS COUPLING EFFECTS IN ANTENNA ARRAYS

TECHNICAL FIELD

The present invention generally relates to methods, testing apparatuses and transceivers, and, more particularly, to devices and techniques for removing cross coupling effects that occur in antenna arrays.

BACKGROUND

The development of ever-decreasing size radio transceivers and ever-increasing capacity demands in recent years has favored the emergence of small-size antenna arrays. Compared to a single antenna, an antenna array has enhanced performance features, such as, interference rejection and beam steering without physically moving the aperture. The higher transmission rates, increasing number of users and other new demands placed on the antenna arrays render addressing cross coupling effects among antenna elements even more important.

An antenna array as illustrated in FIG. 1, generally consists of multiple closely spaced antenna elements (or columns) #1, #2, . . . , #n, typically having a distance d of about 0.5 wavelength in-between antenna elements (which distance for radio communication system frequencies of 0.5-5 GHz is in the range of 3-30 cm). The propagation direction of interest is perpendicular (i.e., y-direction) on the plane (i.e., the plane including the x and z axes) of the antenna elements #1, #2, . . . , #n.

Mutual coupling is an electromagnetic phenomenon which occurs between spatially close electromagnetic radiating elements. Due to the antenna elements' closeness, the effects of mutual coupling in an antenna array may be significant. When an antenna element transmits an electromagnetic signal, resonating neighboring elements (or columns) radiate energy according to the transmitted signal. Similarly, when an antenna element (or column) receives an electromagnetic signal, a portion of the energy of the received signal is re-radiated to the neighboring elements (or columns). In many different areas which use antenna arrays, e.g., from the conventional use of antennas to their modern employment in such exotic areas as multiple-input multiple-output (MIMO) systems, diversity systems, medical imaging, and radar systems, the manner of taking into consideration these mutual coupling effects is important.

Classical theoretical calculations can be used to determine an expected beam pattern in a plane perpendicular to the antenna array plane in the direction of interest. Such calculations are used in designing antenna arrays, and typically assume that the effects of mutual coupling are either non-existent or are so small that they can be neglected. Unfortunately, this assumption becomes increasingly inaccurate as the array elements are spaced closer together and operate in a live air environment. Recently, many attempts have been made to reduce or to compensate for mutual coupling effects.

Some methods which have been proposed to account for these mutual coupling generally result in a compromise design. The compromise design is achieved by repeated iterations and testing. Tradeoffs that impact critical antenna specifications are unavoidable due to design changes implemented to avoid mutual coupling. Typically, the design variables employed to account for the mutual coupling include the radiating element design, the column spacing, the inter-column offsets and the beam formers. This conventional approach to accounting for the mutual coupling of individual elements of an antenna array has the disadvantage that these methods are approximations, and in the end, in spite of the longer antenna design time, the antenna arrays remain plagued by residual mutual coupling impairments.

An accurate determination of mutual coupling coefficients is not straightforward. Although receiving mutual coupling coefficients and transmitting mutual coupling coefficients are expected to be similar, they may differ significantly due to different current distributions that occur on the antenna elements (or columns). Direct measurement of mutual coupling is impractical for a typical antenna array design.

Additionally, although the mutual coupling effects are the most frequently considered cross-coupling effects, these effects may not be the only effects which impair performance. Thus, taking into account mutual coupling effects (which may be measured or estimated) may still leave other quality degrading effects unaccounted for.

Accordingly, it would be desirable to provide devices, systems and methods that avoid the afore-described problems and drawbacks.

SUMMARY

Methods and devices for removing cross coupling effects are provided based on transmitting compensating signals (which are a linear combination of data signals with cross coupling coefficients) so as to recapture the position and level of theoretically calculated null positions. Some of the methods and devices have the advantage that the cross coupling coefficients experimentally determined for an antenna array having a particular design are usable for all other antenna arrays having similar design. The cross coupling coefficients account for mutual coupling between antenna elements and other cross elements phenomena such as edge effects.

According to one exemplary embodiment, an apparatus for determining cross coupling coefficients in an antenna array having a plurality of antenna elements includes a multiplexing block, one or more measurement antennas, and a processor. The multiplexing block is configured to receive data signals to be transmitted via the antenna elements and to output to at least one of the antenna elements a sum signal including (i) a data signal, which data signal is designated for the at least one antenna element, and (ii) a linear combination of data signals designated for other antenna elements of the antenna array, each of the data signals in the linear combination being weighted by a respective cross coupling coefficient between the at least one antenna element and an antenna element emitting the each of the data signals. The one or more measurement antennas are located at positions corresponding to theoretical null points occurring when one or more predetermined sets of data are transmitted via the data signals, the positions being calculated without considering coupling effects of the antenna elements. The processor is configured to receive measurements of a total power received in each of the one or more measurements antennas and the data signals, to adjust the cross coupling coefficients to minimize the total power received by the one or more measurement antennas when the one or more predetermined sets of data are transmitted, and to transmit the adjusted cross coupling coefficients to the multiplexing block.

According to another exemplary embodiment, a method for determining cross coupling coefficients in an antenna array having a plurality of antenna elements is provided. The method includes receiving data signals to be transmitted via the antenna elements, and outputting to at least one of the antenna elements, a sum signal of (i) a data signal among the data signals, which data signal is designated for the at least one antenna element, and (ii) a linear combination of the data signals designated for other antenna elements of the antenna array than the at least one antenna element, each of the data signals in the linear combination being weighted by a respective cross coupling coefficient between the at least one antenna element and an antenna element emitting the each of the data signals. The method further includes measuring total power received in one or more measurement antennas located at positions corresponding to theoretical null points occurring when one or more predetermined sets of data are transmitted via the data signals, the theoretical null points being calculated without considering coupling effects of the antenna elements, and adjusting the cross coupling coefficients to minimize the total power received by he one or more measurement antennas, respectively, when the one or more predetermined sets of data are transmitted via the data signals.

According to another exemplary embodiment, a method of compensating for cross element effects includes receiving data signals to be transmitted via the antenna elements, and outputting to at least one of the antenna elements, a sum signal including (i) a data signal, which data signal is designated for the at least one antenna element, and (ii) a linear combination of data signals designated for other antenna elements of the antenna array, each of the data signals in the linear combination being weighted by a respective cross coupling coefficient between the at least one antenna element and an antenna element emitting the each of the data signals. Cross coupling coefficients between all pairs of antenna elements of the antenna array are predetermined to minimize a total power in theoretical null points occurring when predetermined sets of data are transmitted via the data signals, the theoretical null points being calculated without considering the cross element effects.

According to another exemplary embodiment, a transceiver configured to compensate for cross element effects in an antenna array including a plurality of antenna elements is provided. The transceiver includes a multiplexing block configured to receive data signals to be transmitted via the antenna elements and to output to at least one of the antenna elements, a sum signal including (i) a data signal, which data signal is designated for the at least one antenna element, and (ii) a linear combination of data signals designated for other antenna elements of the antenna array, each of the data signals in the linear combination being weighted by a respective cross coupling coefficient between the at least one antenna element and an antenna element emitting the each of the data signals. The cross coupling coefficients between all pairs of antenna elements of the antenna array are predetermined to minimize a total power in theoretical null points occurring when predetermined sets of data are transmitted via the data signals, the theoretical null points being calculated without considering the cross element effects.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a radio communication system using an antenna array. However, the embodiments to be discussed next are not limited to these systems but may be applied to other wireless communication systems that are affected by cross-element effects.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

In order to remove cross element effects, a signal including a main signal intended to be transmitted by that antenna element, and a linear combination of data signals designated for other antenna elements, is transmitted in each antenna element of an antenna array. The linear combination is a sum of cross terms, each term being a data signal designated for another antenna element of the antenna array, weighted by a respective cross coupling coefficient between the antenna element and the other antenna element emitting the respective data signal. The cross coupling coefficients between all pairs of antenna elements of the antenna array are predetermined to minimize a total power in theoretical null points calculated without considering the cross element effects.

Figure 2:
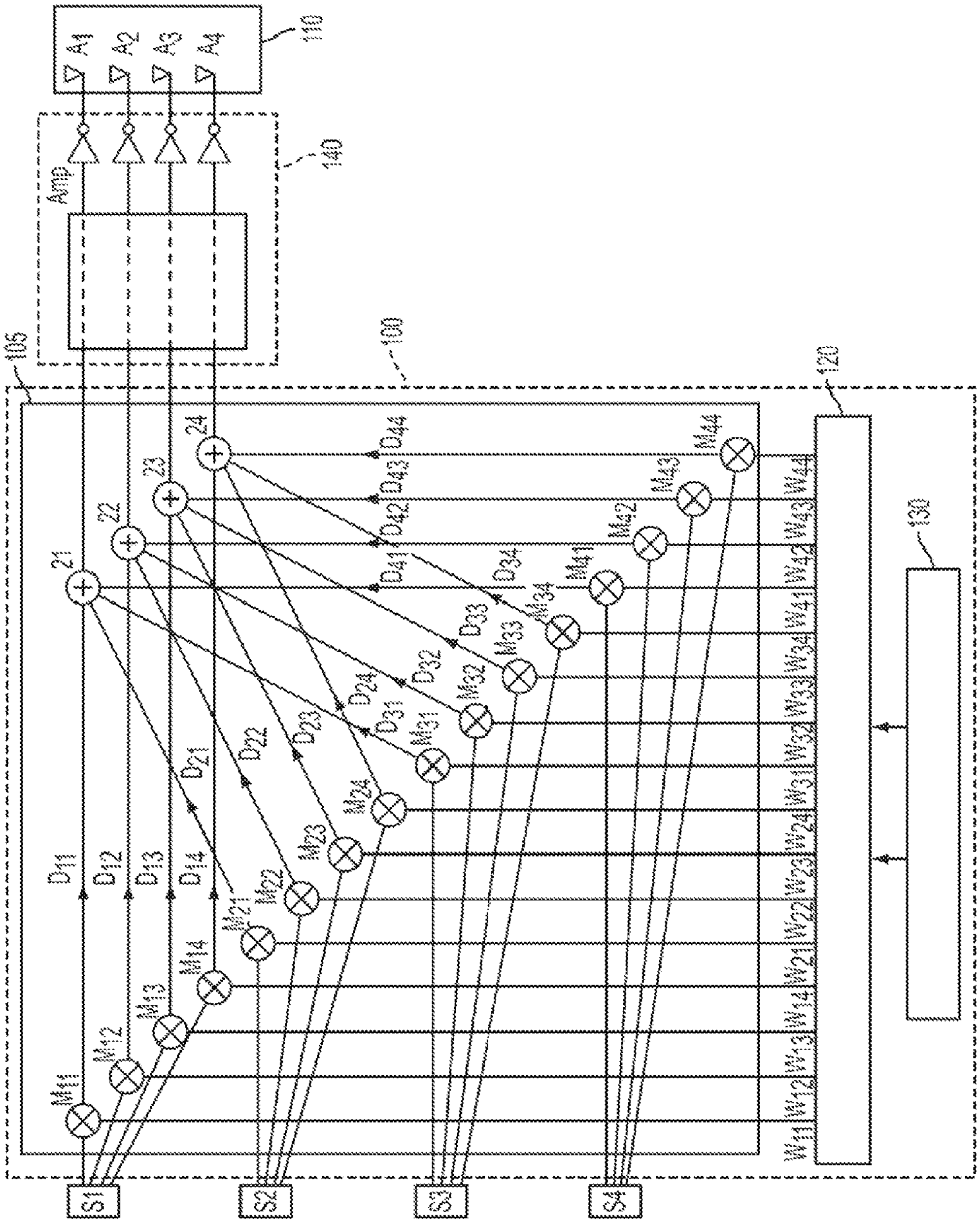
FIG. 2 is a schematic diagram of a transceiver according to an exemplary embodiment.

For purposes of illustration and not of limitation, an exemplary embodiment of a multiplexing block 100, connected to an antenna array 110 having four antenna elements ($A_1$, $A_2$, $A_3$, and $A_4$) is illustrated in FIG. 2. Transceivers having a similar structure may provide transmit signals to any number N (larger than two) of antenna elements.

Each of the data signals S1, S2, S3, and S4 are provided to a set of four multiplexers inside a multiplexing block 105. Thus, S1 is received by $M_{11}$, $M_{12}$, $M_{13}$, $M_{14}$, S2 is received by $M_{21}$, $M_{22}$, $M_{23}$, $M_{24}$, S3 is received by $M_{31}$, $M_{32}$, $M_{33}$, $M_{34}$, and S4 is received by $M_{41}$, $M_{42}$, $M_{43}$, $M_{44}$. The data signals are split or replicated in order to be supplied to the respective set of multiplexer inside or outside (as illustrated in FIG. 2) of the transceiver 100.

Each of the multipliers $M_{ik}$ (where i=1 to 4 and k=1 to 4) outputs a weighted data signal $D_{ik}$ equal to the input data signal Si multiplied with a corresponding weight $w_{ik}$. The diagonal weights $w_{11}$, $w_{22}$, $w_{33}$, and $w_{44}$ are unitary. The off-diagonal weights $w_{12}$, $w_{13}$, . . . , $w_{43}$ account for cross element effects, and are predetermined to minimize a total power in theoretical null points occurring when predetermined sets of data are transmitted via the data signals. The theoretical null points are calculated for the predetermined sets of data being transmitted via data signals S1, S2, S3, and S4, without considering the cross element effects. The weights are complex numbers, characterized, for example, by a magnitude and a phase. The apparatuses and methods employed in determining the weights will be described in detail.

The weights $w_{ik}$ (where i=1 to 4 and k=1 to 4) may be stored semi-permanently in the multipliers, or may be stored in a memory 120 from which the weights are provided to the multipliers $M_{ik}$ when the multiplexing block 105 is activated. In general, there may be several sets of weights corresponding to different frequencies of the data signals. The use of different sets of weights for different frequency ranges leads to better performance. The memory 120 may be inside the transceiver 100 (as illustrated in FIG. 2) or may be and external memory.

The transceiver 100 may also include an interface 130 usable to update the weights stored in the memory 120. Alternatively, multiplexing block 100 may include a different interface (not shown) usable to provide and/or update the weights $w_{ik}$ stored semi-permanently in the multipliers $M_{ik}$.

The multiplexing block 105 further includes four summation circuits: $\Sigma_1$, $\Sigma_2$, $\Sigma_3$, and $\Sigma_4$. Each of the summation circuits $\Sigma_k$ (k=1 to 4) receives weighted data signals $D_{ik}$ from a subset of the multipliers $M_{ik}$ (i=1 to 4). The summation circuit $\Sigma_k$ adds the received weighted data signals to output a signal Ek. The signal Ek is equal to a sum of a data signal Sk (since $w_{kk}$ is unitary), and a linear combination of the other input data signals (i.e., the weighted data signals).

The output signals Ek (k=1 to 4) are transmitted towards the antenna elements Ak, respectively. Between the multiplexing block 105 and the antenna array 110, inside or outside (as illustrated in FIG. 2) of the transceiver 100, a post processing block 140 may include components for performing further processing (e.g., frequency conversion, modulation, and amplification) of the signals Ek prior to being emitted by the antenna elements Ak. The post processing block 140 processes each signal (E1, E2, E3, E4) individually (i.e., this post processing does not involve combining the signals).

A transceiver 100 including the multiplexing block 105 compensates for the cross coupling effects by applying compensating signals in antenna elements other than an antenna element for which a data signal S is intended. The applied compensating signals are equal to the data signal S multiplied with a complex weight w that characterize the pair of the antenna element for which a data signal S is intended and the other antenna element on which a respective compensating signal is applied. Due to the compounded effect of the compensating signals, the beam is formed as if only the antenna element for which a data signal S is intended radiates, without cross element (e.g., mutual coupling) effects.

If a transceiver provides transmit signals to a number N (larger than two) of antenna elements, the transceiver will include N×N multiplexers $M_{ik}$ (where i=1 to N and k=1 to N), and N summer circuits $\Sigma_k$ (k=1 to N).

Figure 3:
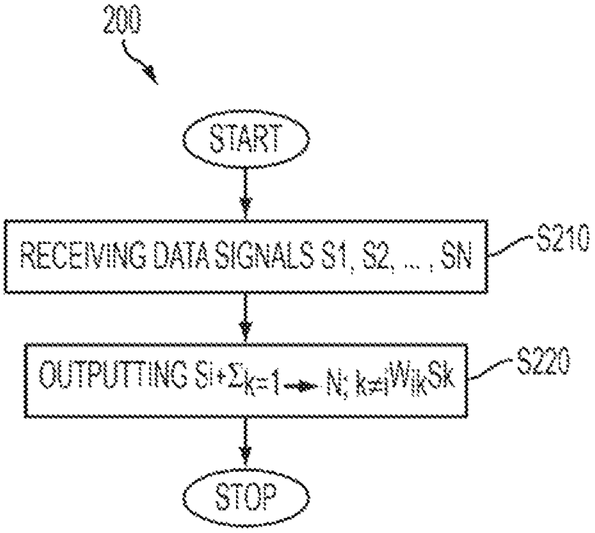
FIG. 3 is a flow diagram of a method of compensating for cross element effects in an antenna array according to an exemplary embodiment.

A transceiver, having a structure similar to the transceiver 100 in FIG. 2, and connected to an antenna array with N antenna elements, may perform a method 200 of compensating for cross element effects. A flow diagram of the method 200 is illustrated in FIG. 3. Various embodiments performing the method 200 may be implemented in hardware, software or a combination thereof.

The method 200 includes, at S210, receiving data signals (e.g., S1, . . . , SN) to be transmitted via N antenna elements. At S220, the method 200 further includes outputting to at least one of the N antenna elements (e.g., antenna element i), a sum signal including (a) a data signal (i.e., Si), which data signal is designated for the at least one antenna element, and (b) a linear combination of data signals designated for other antenna elements of the antenna array, each of the data signals in the linear combination being weighted by a respective cross coupling coefficient between the at least one antenna element and an antenna element emitting the each of the data signals (i.e., $\Sigma_{k=1 \to N;\ k \neq i} w_{ik} Sk$).

Generally, cross element effects, such as mutual coupling, are relatively the same for antenna arrays having the same design. For example, it has been observed that measured mutual impedances (which characterize the mutual coupling) of different antenna arrays of same design have substantially equal values. Therefore, once weights used to compensate for the cross element effects for a particular design are established, they can be used for all other antenna arrays of same design.

Figure 4:
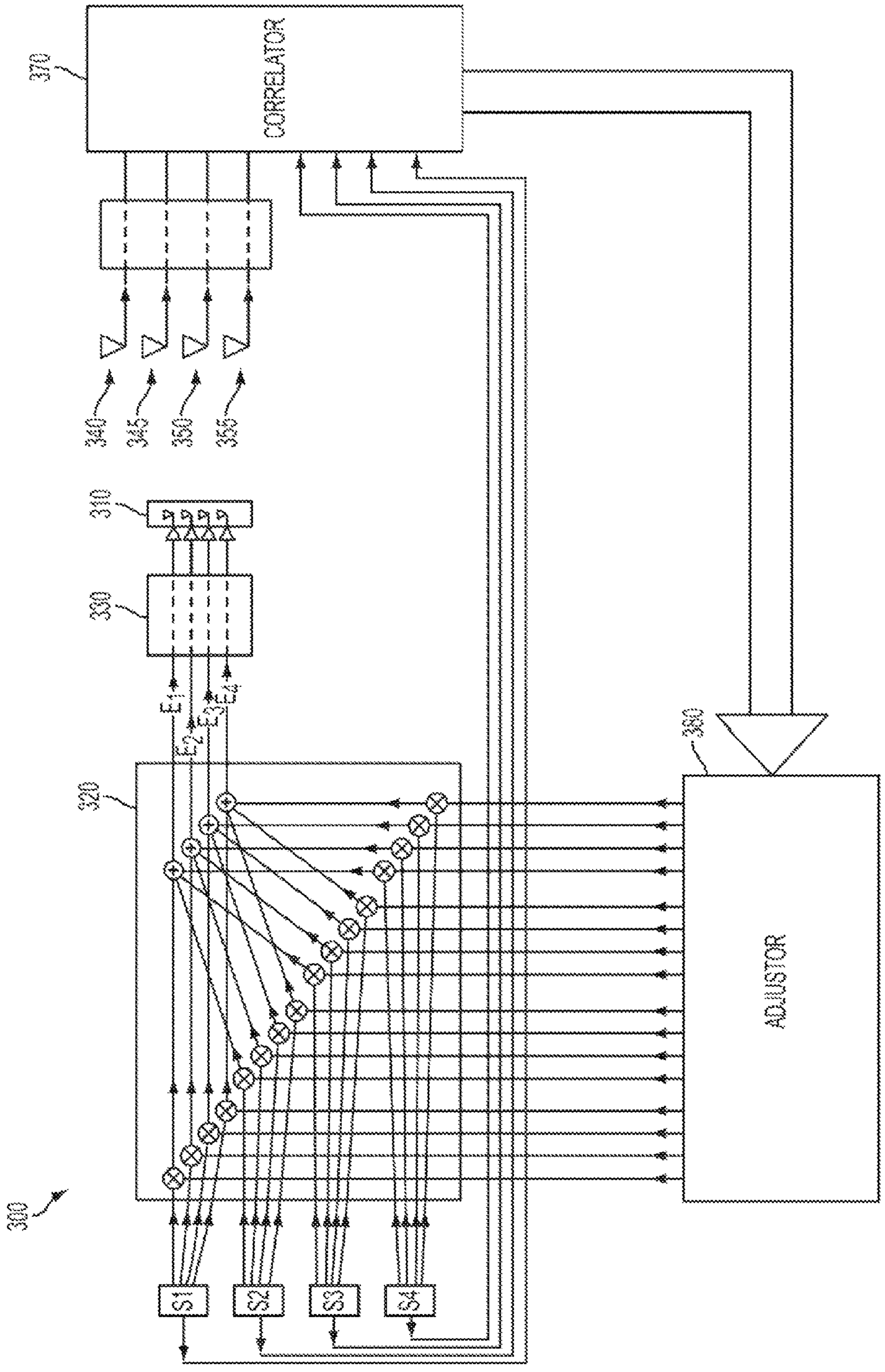
FIG. 4 is a schematic diagram of an apparatus for determining cross coupling coefficients in an antenna array according to an exemplary embodiment.

FIG. 4 is a schematic diagram of an apparatus 300 for determining cross coupling coefficients in an antenna array 310, according to an exemplary embodiment. The antenna array 310 includes four antenna elements, but four is merely an illustrative number and is not intended to be limiting.

The apparatus 300 includes a multiplexing block 320 configured to receive data signals (S1, S2, S3, S4) to be transmitted via the antenna elements of the antenna array 310, and to output towards at least one of the antenna elements (e.g., antenna element i) a sum signal (Ei) including (a) a data signal (Si), which data signal is designated for the at least one antenna element, and (b) a linear combination of data signals designated for other antenna elements of the antenna array, each of the data signals in the linear combination being weighted by a respective cross coupling coefficient between the at least one antenna element and an antenna element emitting the each of the data signals (i.e., $\Sigma_{k=1 \to N;\ k \neq i} w_{ik} Sk$).

A post processing block 330 may further process the signals Ei individually prior to the signals being emitted via the antenna elements.

The apparatus 300 further includes one or more measurement antennas 340, 345, 350, and 355, which are located at positions (e.g., z1, z2, z3, z4) corresponding to theoretical null points. The null points are positions at which amplitude of an electromagnetic beam due to the data signals S1, S2, S3, and S4 is at a minimum (e.g., zero). The null points are calculated based on well-known electromagnetic equations without considering coupling effects of the antenna elements. The number of null points may be equal to or larger than the number of antennas, depending on the input signals. In general, the null points can be formed in many ways using different data transmitted via the signals S1 . . . SN. For a three column antenna, three null points may be used, for a four column antenna, four or five null points may be used, etc.

Figure 1:
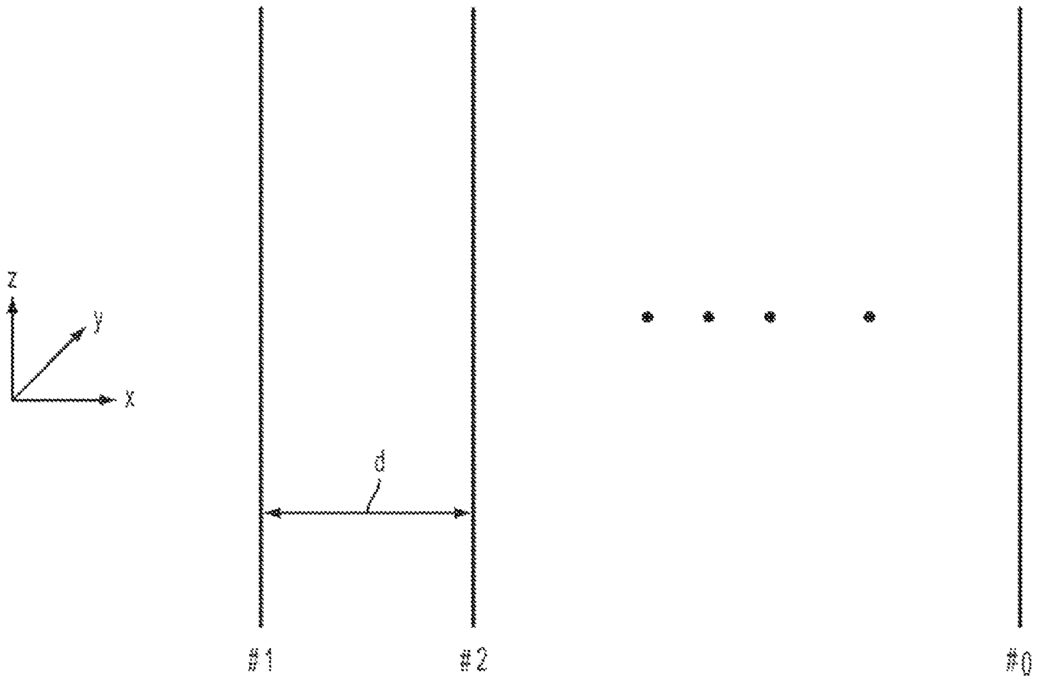
FIG. 1 is a schematic diagram of an antenna array.
Figure 5:
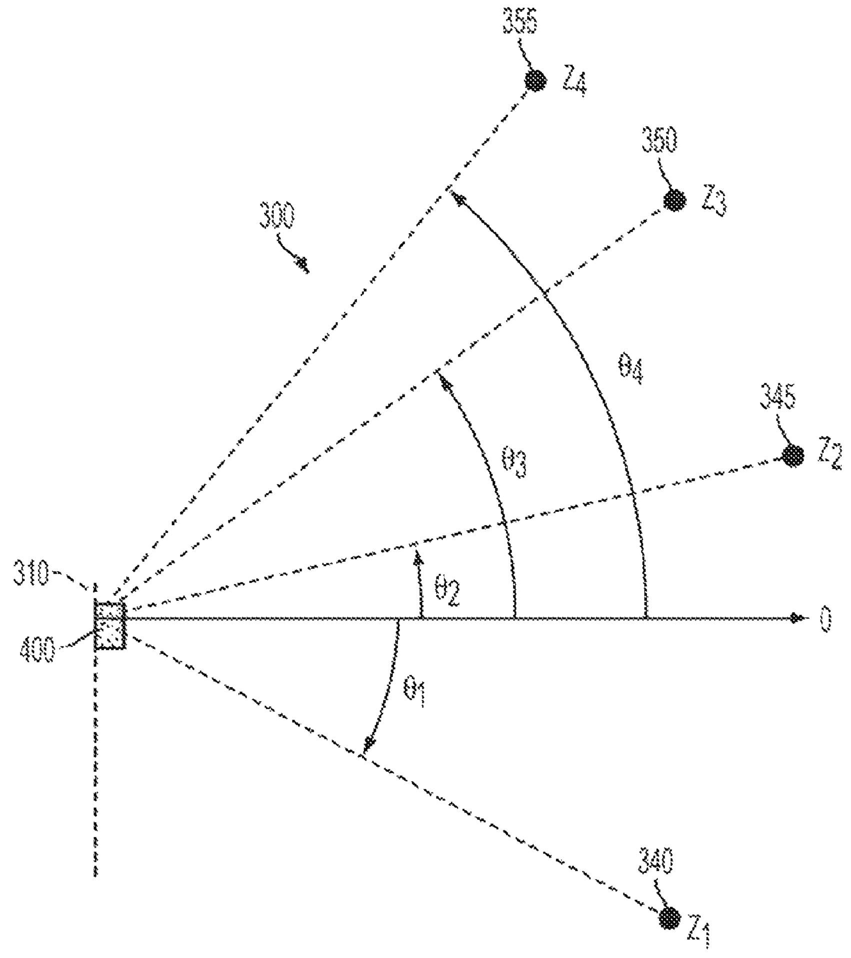
FIG. 5 is a schematic diagram of a test set-up according to an exemplary embodiment.

Far enough from the location of the antenna array 310, the theoretical null points may be characterized by azimuth angles $\theta_1$, $\theta_2$, $\theta_3$ and $\theta_4$ with a plane of the antenna array (an origin of which is the middle of the antenna array) as illustrated in FIG. 5. An azimuth angle convention frequently used is 0° in the y-axis direction with positive angles clockwise in the x-y plane in FIG. 1 looking down on the z-axis. Using this convention, for a three column antenna array, nulls may be, for example, located at azimuth angles at about +38°, 0°, and −38°.

The apparatus 300 may include a plurality of antennas, each of which is placed at one of the theoretical null points. Alternatively, the apparatus 300 may include a single antenna that is successively placed at each position of the theoretical null points. The apparatus may include a position measurement assembly 400 configured to enable locating the positions corresponding to the theoretical null points relative to the antenna array.

The apparatus 300 further includes a processor configured to receive measurements of the power received in each of the measurements antennas (or the same antenna at different positions) and the data signals, in order to adjust the cross coupling coefficients to minimize the total power. Obtaining the cross coupling coefficients is an iterative process, newly adjusted cross coupling coefficients being transmitted to the multiplexing block 320. The processor may include a correlator 370 and an adjustor 380.

The correlator 350 may be configured to receive the measurements of the total power received in each of the (one or more) measurements antennas 340, 345, 350 and 355 and the data signals S1, S2, S3 and S4. The correlator 370 may be configured to output normalized power values calculated based on the total power and the data signals.

The adjustor 380 may be configured to receive the normalized power values from the correlator 370, in order to adjust the cross coupling coefficients using the normalized power values. The adjustor 380 may also be configured to output the adjusted cross coupling coefficients to the multiplexing block 320.

The processor may be implemented as a combination of software and hardware. In order to obtain an optimal combination of cross coupling coefficients when, for example, with K null measurements and N columns are considered, a multivariate downhill method may be applied sequentially to minimize a multi-objective function of N*(N−1) variables:

$$\text{Minimize}\sum_{k=1}^{K}\{\alpha_k|Y_k(w_1, w_2, \ldots, w_{N*(N-1)})|^2\}$$

where $Y_k$ is the amplitude of the $k^{th}$ signal captured in a measurement antenna and $\alpha_k$ is an optional measurement emphasis parameter. The optimization variables, which are related to the cross-coupling coefficients, are:

$$w_1 = w_{r1} + jw_{i1}$$

$$w_2 = w_{r2} + jw_{i2}$$

$$\vdots$$

$$w_{N*(N-1)} = w_{rN*(N-1)} + jw_{iN*(N-1)}$$

Based on a downhill method, the weight update $w_{k,i}$ at iteration n is:

$$w_i(n+1)=w_i(n)+\mu_i$$

where $w_i$ is the weight i=1, 2, . . . N*(N−1), $\mu_i$ is the convergence constant. One or more than one weight may be adjusted at the same time. The weights are thus updated using an iterative method.

The convergence constant $\mu_i$ determines the rate at which the optimization will converge. The larger the convergence constant, the faster the algorithm will converge.

Figure 6:
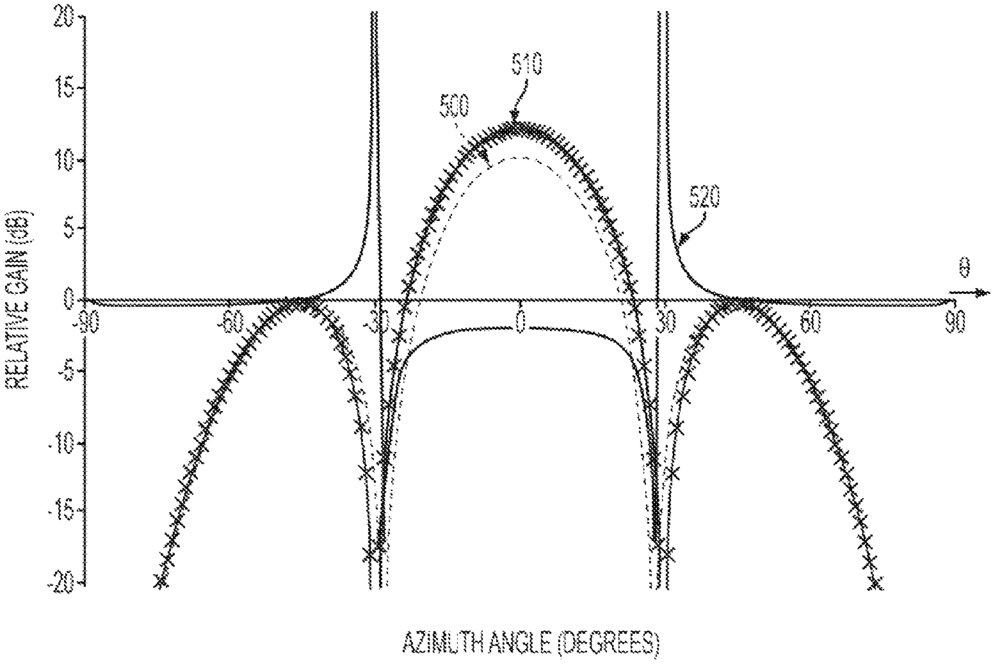
FIG. 6 is a graph illustrating an uncompensated antenna pattern, a theoretical antenna pattern, and a first error as functions of an azimuth angle.
Figure 7:
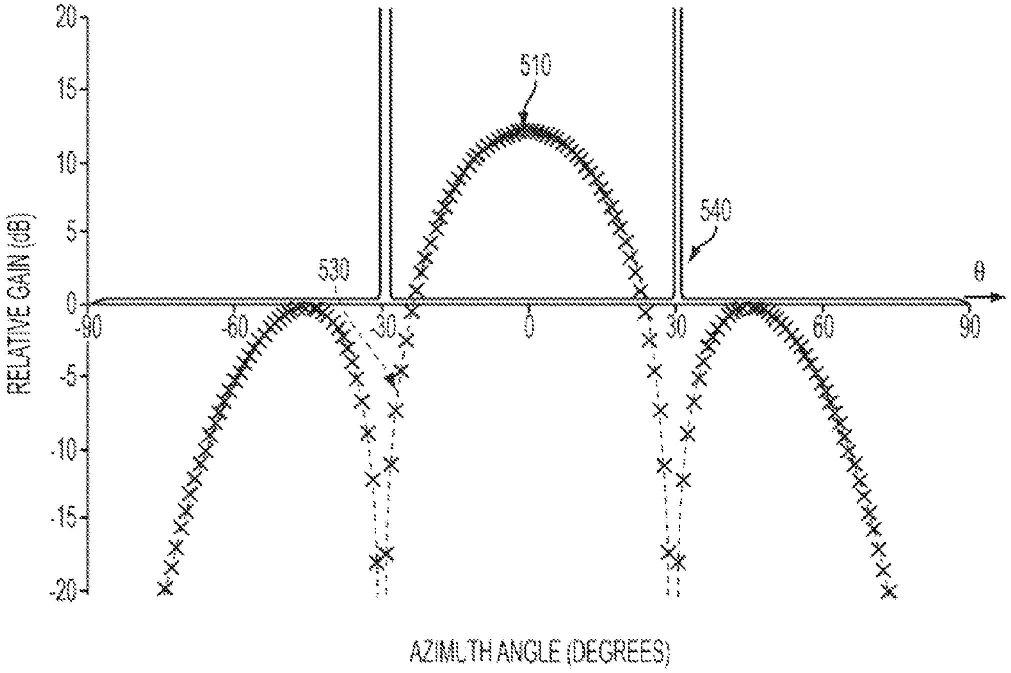
FIG. 7 is a graph illustrating an antenna pattern after compensation for coupling effects in a closest neighboring antenna element, the theoretical antenna pattern, and a second error as functions of the azimuth angle.
Figure 8:
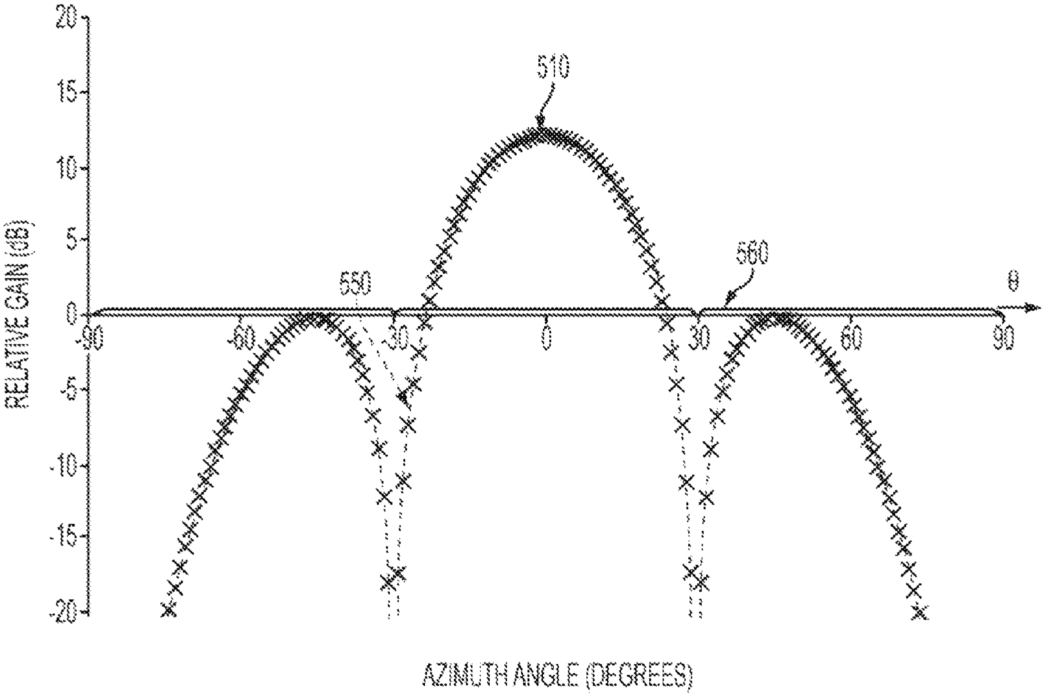
FIG. 8 is a graph illustrating an antenna pattern after compensation for coupling effects in more than the closest neighboring antenna element, the theoretical antenna pattern, and a third error as functions of the azimuth angle.

FIG. 6 is a graph illustrating an uncompensated antenna pattern 500, a theoretical antenna pattern 510, and a first error 520 (which is the difference between 500 and 510) as functions of the azimuth angle θ. FIG. 7 is a graph illustrating an antenna pattern 530 after compensation for coupling effects in the closest neighboring antenna element (i.e. after steps 1 and 2 above), the theoretical antenna pattern 510, and a second error 540 (i.e., the difference between 530 and 510) as functions of the azimuth angle θ. FIG. 8 is a graph illustrating an antenna pattern 550 after compensation for coupling effects in more than the closest neighboring antenna element (i.e. after steps 1, 2, 3 and 4 above), the theoretical antenna pattern 510, and a third error 560 (i.e., the difference between 550 and 510) as functions of the azimuth angle θ. The graphs in FIGS. 6, 7, and 8 are generated by a computer simulation, from which the ability to compensate for mutual coupling effects can be seen.

Figure 9:
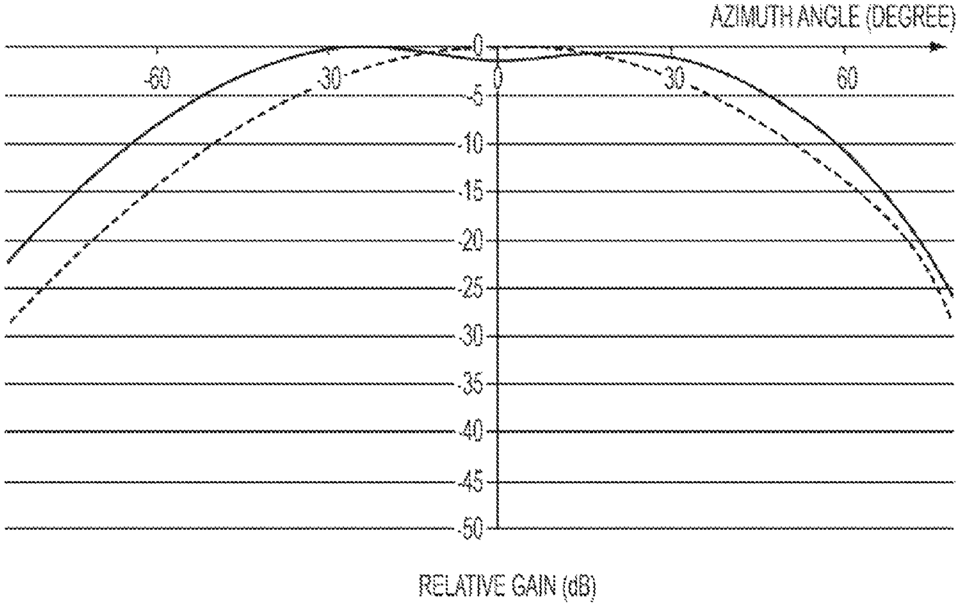
FIG. 9 is a graph illustrating a measured antenna pattern of a middle column of a three antenna array both without a correction using cross coupling coefficients and when using correction, according to an exemplary embodiment.

FIG. 9 is a graph illustrating measured antenna patterns of a middle column of a three column antenna before correcting for coupling effects 560, and after correcting for coupling effects 570 based on the afore-described techniques. The x-axis of the graph is the azimuth angle and the y axis is the gain.

Figure 10:
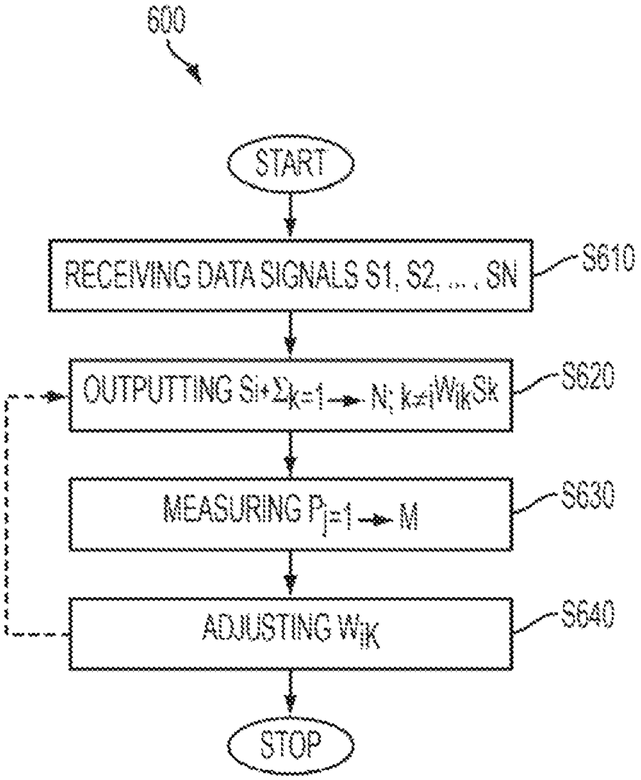
FIG. 10 is a flow diagram of a method for determining cross coupling coefficients in an antenna array having a plurality of antenna elements.

FIG. 10 is a flow diagram of a method 600 for determining cross coupling coefficients in an antenna array having a plurality of antenna elements. The method 600 includes receiving (S610) data signals to be transmitted via the antenna elements. The method 600 further includes outputting (S620) to at least one of the antenna elements, a sum signal of (i) a data signal among the data signals, which data signal is designated for the at least one antenna element, and (ii) a linear combination of the data signals designated for other antenna elements of the antenna array than the at least one antenna element, each of the data signals in the linear combination being weighted by a respective cross coupling coefficient between the at least one antenna element and an antenna element emitting the each of the data signals. The method 600 further includes measuring (S630) total power received in each of one or more measurement antennas located at positions corresponding to theoretical null points occurring when one or more predetermined sets of data are transmitted via the data signals, the theoretical null points being calculated without considering coupling effects of the antenna elements. The method 600 also includes adjusting (S640) the cross coupling coefficients to minimize the total power received by the one or more measurement antennas, respectively, when the one or more predetermined sets of data are transmitted via the data signals.

Steps S620, S630 and S640 of the method 600 may be performed iteratively until a predetermined convergence criterion is met. If a plurality of measuring antennas are used, the method 600 may include placing a measurement antenna at each of the theoretical null points. Alternatively, the method 600 may include sequentially placing the same measurement antenna at each of the theoretical null points. In the method 600, each subset of cross coupling coefficients between one antenna element and other antenna elements may be obtained separately from all other the cross coupling coefficients, by performing S620 as if the data signals include only a single data signal to be transmitted via the one antenna element.

The above-described methods, transceivers and apparatuses provide the ability to compensate for cross coupling (including but not limited to mutual coupling) while reducing the design time for antenna arrays by reducing the number of iterations that would otherwise be needed to achieve a good performance. Thus, they provide greater freedom in the choice of element design to better optimize attributes such as cost, manufacturability and repeatability. An antenna array operating in compensating mode behaves much closer to a theoretical antenna array thus yielding predictable performances and maximizing the benefit of using associated algorithms.

Unlike direct measurement of mutual coupling only, some of the above-described methods and devices also account for other non-idealities in the antenna array such as mechanical tolerances, effects of the actual radio equipment hardware, finite ground-plane effects, etc.

The disclosed exemplary embodiments provide methods, testing apparatuses and transceivers compensating for coupling effects that occur in antenna arrays. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. An apparatus for determining cross coupling coefficients in an antenna array having a plurality of antenna elements, the apparatus comprising:

a multiplexing block configured to receive data signals to be transmitted via the antenna elements and to output to at least one of the antenna elements a sum signal including a data signal, which is designated for the at least one antenna element, and a linear combination of data signals designated for other antenna elements of the antenna array, each of the data signals in the linear combination being weighted by a respective cross coupling coefficient between the at least one antenna element and an antenna element emitting the each of the data signals;

one or more measurement antennas located at positions corresponding to theoretical null points occurring when one or more predetermined sets of data are transmitted via the data signals, the positions being calculated without considering coupling effects of the antenna elements; and a processor configured to receive measurements of a total power received in each of the one or more measurements antennas and the data signals, to adjust the cross coupling coefficients to minimize the total power received by the one or more measurement antennas when the one or more predetermined sets of data are transmitted, and to transmit the adjusted cross coupling coefficients to the multiplexing block.

2. The apparatus of claim 1, further comprising:

a position measurement assembly configured to allow locating the positions corresponding to the theoretical null points relative to the antenna array.

3. The apparatus of claim 1, wherein the one or more measurement antennas include one measurement antenna for each of the theoretical null points.

4. The apparatus of claim 1, wherein a single measurement antenna is successively placed at at least two of the theoretical null points.

5. The apparatus of claim 1, wherein the processor is configured to adjust the cross coupling coefficients using a multivariate downhill iterative method.

6. The apparatus of claim 5, wherein the multivariate downhill iterative method minimizes a multi-objective function $$\sum_{k=1}^{K}\{\alpha_k|Y_k(w_1, w_2, \ldots, w_{N*(N-1)})|^2\}$$

where $Y_k$ (k=1, K) is the amplitude of a $k^{th}$ signal captured in one of the measurement antenna, K is a number of theoretical nulls, $w_i$ (i=1, N*(N−1)) are complex optimization variables related to the cross-coupling coefficients, N is the number of columns, and $\alpha_k$ is an optional measurement emphasis parameter.

7. The apparatus of claim 1, wherein:

the multiplexing block is configured to output a single data signal to a single one of the antenna elements, and to output to one or more other antenna elements the signal data signal weighted by a cross coupling coefficient between the one of the antenna elements and the one or more other antenna elements; and the processor is configured to adjust a subset of the cross coupling coefficients between the one antenna elements and the one or more other antenna elements.

8. The apparatus of claim 7, wherein the processor is configured to adjust the subset of the cross coupling coefficients in an order depending on a proximity of the one or more other antenna elements to the one antenna element.

9. The apparatus of claim 1, wherein the processor is configured to control the multiplexing block to output respective sums of signals to the at least one of the antenna elements, and to adjust the cross coupling coefficients iteratively, until a predetermined criterion is met.

10. The apparatus of claim 1, wherein the processor includes:

a correlator configured to receive the measurements of the total power received in each of the one or more measurements antennas and the data signals, and to output normalized power values calculated based on the total power and the data signals; and an adjustor configured to receive the normalized power values from the correlator, to adjust the cross coupling coefficients using the normalized power values, and to output the adjusted cross coupling coefficients to the multiplexing block.

11. The apparatus of claim 1, wherein the multiplexing block is configured to use different sets of cross coupling coefficients for frequencies of the data signals in different frequency ranges.

12. The apparatus of claim 1, wherein a number of position corresponding to theoretical null points is equal to or larger than a number of antenna elements of the antenna array.

13. A method for determining cross coupling coefficients in an antenna array having a plurality of antenna elements, the method comprising:

receiving data signals (S1, S2, S3, S4) to be transmitted via the antenna elements;

outputting to at least one of the antenna elements, a sum signal of a data signal among the data signals, which data signal is designated for the at least one antenna element, and a linear combination of the data signals designated for other antenna elements of the antenna array than the at least one antenna element, each of the data signals in the linear combination being weighted by a respective cross coupling coefficient between the at least one antenna element and an antenna element emitting the each of the data signals;

measuring total power received in one or more measurement antennas located at positions corresponding to theoretical null points occurring when one or more predetermined sets of data are transmitted via the data signals, the theoretical null points being calculated without considering coupling effects of the antenna elements; and adjusting the cross coupling coefficients to minimize the total power received by the one or more measurement antennas, respectively, when the one or more predetermined sets of data are transmitted via the data signals.

14. The method of claim 13, wherein the outputting, the measuring and the adjusting are performed iteratively until a predetermined convergence criterion is met.

15. The method of claim 13, wherein each of the positions corresponding to the theoretical null points relative to the antenna array are characterized by an angle of a plane of the antenna array and a direction from a middle point of the array to the each of the position.

16. The method of claim 13, further comprising:

placing one of the one or more measurement antenna at each of the theoretical null points.

17. The method of claim 13, further comprising:

sequentially placing the same measurement antenna at each of the theoretical null points.

18. The method of claim 13, wherein the adjusting of the cross coupling coefficients uses a multivariate steepest descent method.

19. The method of claim 13, wherein the cross coupling coefficients are complex numbers, and adjusting includes adjusting a phase of one of the cross coupling coefficients prior to adjusting a magnitude of the one cross coupling coefficient.

20. The method of claim 13, wherein each subset cross coupling coefficients between one antenna element and other antenna elements is obtained separately from all other of the cross coupling coefficients, by performing the outputting as if the data signals include only a single data signal to be transmitted via the one antenna element.

* * * * *